(12) United States Patent  
Suzuki

(10) Patent No.: US 7,001,306 B2  
(45) Date of Patent: Feb. 21, 2006

(54) BRAKE CONTROL APPARATUS

(75) Inventor: Hidetoshi Suzuki, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 138 days.

(21) Appl. No.: 10/758,542

(22) Filed: Jan. 16, 2004

(65) Prior Publication Data

US 2004/0162187 A1    Aug. 19, 2004

(30) Foreign Application Priority Data

Feb. 18, 2003  (JP)  ............................. 2003-039168  
Nov. 28, 2003  (JP)  ............................. 2003-399507

(51) Int. Cl.  
*B60K 41/20*  (2006.01)

(52) U.S. Cl. ............................. 477/4; 477/29; 477/183

(58) Field of Classification Search ................. 477/4, 477/27, 29, 183–187  
See application file for complete search history.

(56) References Cited

U.S. PATENT DOCUMENTS

| | | | |
|---|---|---|---|
| 5,287,772 A * | 2/1994 | Aoki et al. ..................... | 477/20 |
| 5,399,000 A * | 3/1995 | Aoki et al. ..................... | 303/3 |
| 6,434,469 B1 | 8/2002 | Shimizu et al. | |
| 6,570,265 B1 * | 5/2003 | Shiraishi et al. ........... | 290/40 C |

FOREIGN PATENT DOCUMENTS

| | | | |
|---|---|---|---|
| EP | 1291219 | * | 12/2003 |
| JP | 11-018208 A | | 1/1999 |
| JP | 11-240351 A | | 9/1999 |
| JP | 2000-344078 A | | 12/2000 |

* cited by examiner

*Primary Examiner*—Ha Ho  
(74) *Attorney, Agent, or Firm*—Shinjyu Global IP Counselors, LLP

(57) ABSTRACT

A brake control apparatus is provided that distributes an engine braking torque Tbe to the front and rear wheels in accordance with an ideal braking torque distribution to suppress and prevent the tendency for one of either the front or rear wheels to lock when the engine braking torque operates. When the road surface friction state is a low friction state and the engine braking torque operates, the brake control apparatus derives an engine braking torque Tbe and distributes the engine braking torque Tbe to the front and rear wheels in accordance with the ideal braking torque distribution. In addition, when the engine braking torque reduction amount is small, the engine drives a generator connected to the engine. When the friction state between the wheels and the road surface is not in the low friction state, the generator attached to the engine is operated as a motor that supplements driving of the engine to reduce the engine braking torque of the engine.

30 Claims, 5 Drawing Sheets

BRAKE CONTROL APPARATUS

BACKGROUND OF THE INVENTION

1. Field of the Invention

The present invention relates to a brake control apparatus of a vehicle wherein one of either the front or rear wheels are driven by an engine and the other wheels are connected to a generator capable of regenerative (electrical) braking, and that is ideally suited to a four-wheel drive vehicle such as, for example, one wherein the main drive wheels are driven by an engine, and the subordinate drive wheels can be braked by a generator.

2. Background Information

As an example of such a four-wheel drive vehicle, there is a so-called motor four-wheel drive vehicle wherein one of either the front or rear wheels (referred to herein as the main drive wheels) are driven by an engine, and the other wheels (referred to herein as the subordinate drive wheels) are supplementarily driven by a generator, and wherein, during vehicle deceleration, the generator is regeneratively operated, and that regenerative (electrical) braking torque decelerates the vehicle (e.g., refer to the Japanese Laid Open Patent Application No. 11-240351.

In view of the above, it will be apparent to those skilled in the art from this disclosure that there exists a need for an improved brake control apparatus. This invention addresses this need in the art as well as other needs, which will become apparent to those skilled in the art from this disclosure.

SUMMARY OF THE INVENTION

It has been discovered that in the aforementioned conventional four-wheel drive vehicle that the generator generates regenerative braking torque only when the driver depresses the brake pedal, and there is consequently a problem in that, in a case where the brake pedal is not depressed and a large braking torque from the engine braking torque acts only upon the main drive wheels, the braking torque of the front and rear wheels is not ideally distributed (an ideal distribution being one that tends to lock the front and rear wheels simultaneously) and, as a result, one of either the front or rear wheels tend to lock before the other wheels.

The present invention focuses on the aforementioned problems, and has an object to provide a brake control apparatus that can prevent the tendency for one of either the front or rear wheels to lock before the other wheels by not applying the large braking torque from the engine braking torque only to the main drive wheels.

To solve the aforementioned problems, the brake control apparatus of the present invention is basically provided with an engine braking torque computing section and a generator braking torque controlling section. The engine braking torque computing section is configured and arranged to compute an engine braking torque of an engine that drives a first wheel. The generator braking torque controlling section is configured and arranged to control an electrical braking torque of a generator that is configured and arranged to electrically brake a second wheel so that a first to second target wheel braking torque distribution approaches an ideal braking torque distribution between the first and second wheels based on the engine braking torque computed by the engine braking torque computing section, when the engine applies the engine braking torque to the first wheel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
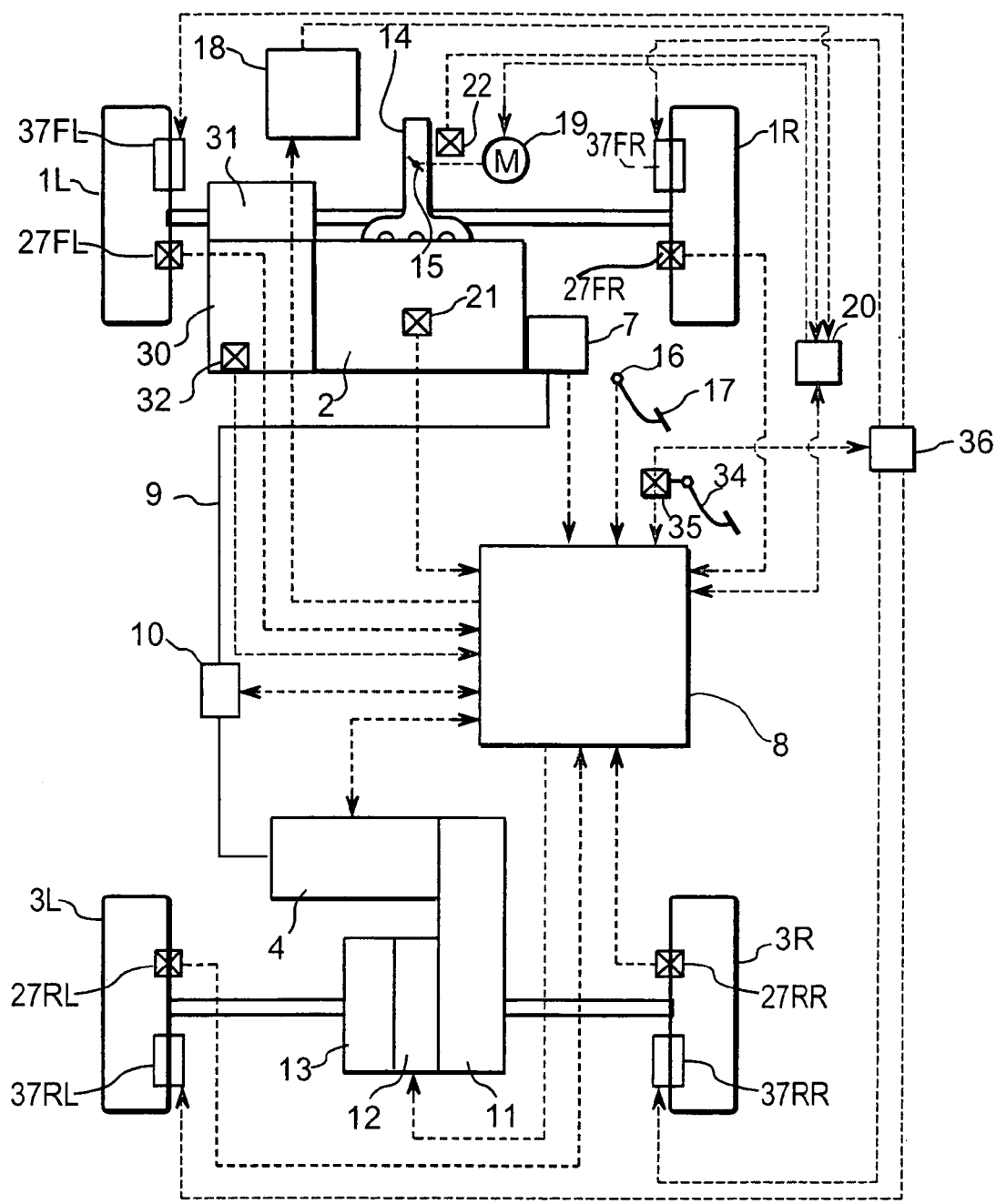
FIG. 1 is a schematic block diagram of a vehicle equipped with a vehicle brake control apparatus in accordance with one embodiment of the present invention.

Referring initially to FIG. 1, a four wheel drive vehicle is diagrammatically illustrated that is equipped with a vehicle brake control apparatus in accordance with a first embodiment of the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4. Thus, the front wheels 1L and 1R serve as the main drive wheels, while the rear wheels 3L and 3R serve as the subordinate drive wheels, which can be selectively driven by the electric motor 4.

As also shown in the FIG. 1, the engine output torque Te of the internal combustion engine 2 is transferred to the left and right front wheels 1L and 1R through an automatic transmission 30 and a differential gear 31. A portion of the engine output torque Te of the internal combustion engine 2 is transferred to a generator 7 that supplies electrical energy to the electric motor 4.

In other words, the engine 2 is operatively attached to the generator 7, which supplies electrical energy to the electric motor 4. The generator 7 is directly coupled by a splined joint or the like to a rotary shaft inside the engine 2, such as a camshaft or a crankshaft, or to a gear shaft that rotates both of them. The generator 7 rotates at a speed Nh, which is the product of the speed Ne of the engine 2 and a prescribed reduction ratio (or speed increasing ratio). The load placed on the internal combustion engine 2 by the generator 7 is used to generate a voltage corresponding to the load torque. In particular, a four-wheel drive (4WD) controller 8 adjusts the field current Ifh of the generator 7 to control the voltage generated by the load torque. The electrical power or voltage generated by the generator 7 can be supplied to the motor 4 via an electric wire 9. A junction box 10 is provided an intermediate point in the electric wire 9 between the electric motor 4 and the generator 7. A drive shaft of the electric motor 4 is selectively connected to the rear wheels 3L and 3R via a reduction gear 11, a clutch 12 and a differential gear 13.

Furthermore, the generator 7 in the present embodiment can also be used to supplement the drive torque from the engine 2. Namely, the electrical power obtained from the motor 4, when the motor 4 is operated regeneratively to function as a generator, is supplied to the generator 7, thereby supplementing the drive torque of the engine 2. Specifically, when the motor 4 is operated regeneratively, i.e., when the engine 2 is generating engine braking torque, the generator 7 functions as a motor that drives the engine 2. Thus, when the engine 2 is generating engine braking torque and the generator 7 functions as a motor to supplement the drive torque of the engine 2 to enable a reduction in the engine braking torque. Accordingly, the generator 7 corresponds to a second motor of the present invention. When the generator 7 functions as a generator, the generated torque is also controlled by a field current Imf command value from the 4WD controller 8.

A main throttle valve 15 is disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position or sensor, or a throttle opening instructing device or sensor. However, the throttle valve 15 is not mechanically linked to the depression quantity of the accelerator pedal 17, but is rather a so-called accelerator by wire type, wherein a stepping motor 19 is an actuator, and the throttle opening is adjusted and controlled by the rotational angle corresponding to the step count thereof. Specifically, the depression quantity of the accelerator pedal 17, i.e., the accelerator pedal position $Acc_1$, is detected by an accelerator pedal sensor 16, and the rotational angle of the stepping motor 19, i.e., the step count, is normally controlled so that the throttle opening is set corresponding to that detected accelerator pedal position $Acc_1$. The rotational angle of the stepping motor 19 is feedback controlled by a drive signal from a motor controller 20 based on the throttle opening detection value detected by a throttle sensor 22. Herein, by adjusting the throttle opening of the throttle valve 15 to a throttle opening different than a throttle opening in accordance with the depression amount of the accelerator pedal 17, the output torque of the engine 2 can be controlled independent of the operation of the accelerator pedal by the driver. Incidentally, when a throttle opening command value is output from an engine controller 18 or the 4WD controller 8, the throttle opening is controlled so that it reaches the throttle opening command value.

The depression amount detection value or the accelerator pedal position $Acc_1$ detected by the accelerator sensor 16 is outputted as a control signal to the 4WD controller 8. The throttle sensor 22 can also be used to the accelerator pedal position $Acc_1$ by detecting the throttle opening. Thus, either the accelerator sensor 16 or the throttle sensor 22 can be considered to constitute a throttle opening determining section. The accelerator sensor 16 also constitutes an acceleration instruction sensor. The phrase "accelerator position opening degree" as used herein refers to either a throttle opening amount of the main throttle valve 15 or a depression amount of the accelerator pedal 17 or similar accelerator device. Thus, the phrase "accelerator position opening degree" as used herein refers to either a throttle opening amount of the main throttle valve 15 or a depression amount of the accelerator pedal 17 or similar accelerator device.

In addition, an engine speed sensor 21 is provided that detects the speed of the engine 2, and the engine speed sensor 21 outputs the detected signal to an engine controller 18 and the 4WD controller 8. The engine speed sensor 21 constitutes an engine speed detecting section.

The engine controller 18 controls the operating state of the engine 2 so that it obtains a target rotational torque corresponding to, for example, the depression amount of the accelerator pedal 17 detected by the accelerator pedal sensor 16, i.e., the accelerator pedal position. However, if a prescribed engine torque is demanded by the 4WD controller 8, then the engine controller 18 controls the operating state of the engine by adjusting the throttle opening of the throttle valve 15, so that that engine torque is obtained.

The transmission 30 is provided with a gear shift position detector or sensor 32 that is configured and arranged to detect the current gear shift range of the transmission 30. The shift position detecting sensor 32 is configured and arranged to output or send a detected shift position signal indicative of the current gear range of the transmission 30 to the 4WD controller 8.

A brake pedal 34 is provided that constitutes a brake instructing/operating section. The stroke amount of the brake pedal 34 is detected by a brake stroke sensor 35, which constitutes a brake operation amount sensor outputs the brake stroke amount it detects to a brake controller 36 and the 4WD controller 8.

The brake controller 36 controls the braking force or torque acting on the vehicle by controlling the braking devices (e.g., disc brakes) 37FL, 37FR, 37RL and 37RR that are installed on the wheels 1L, 1R, 3L and 3R in response to the inputted brake stroke amount.

Figure 2:
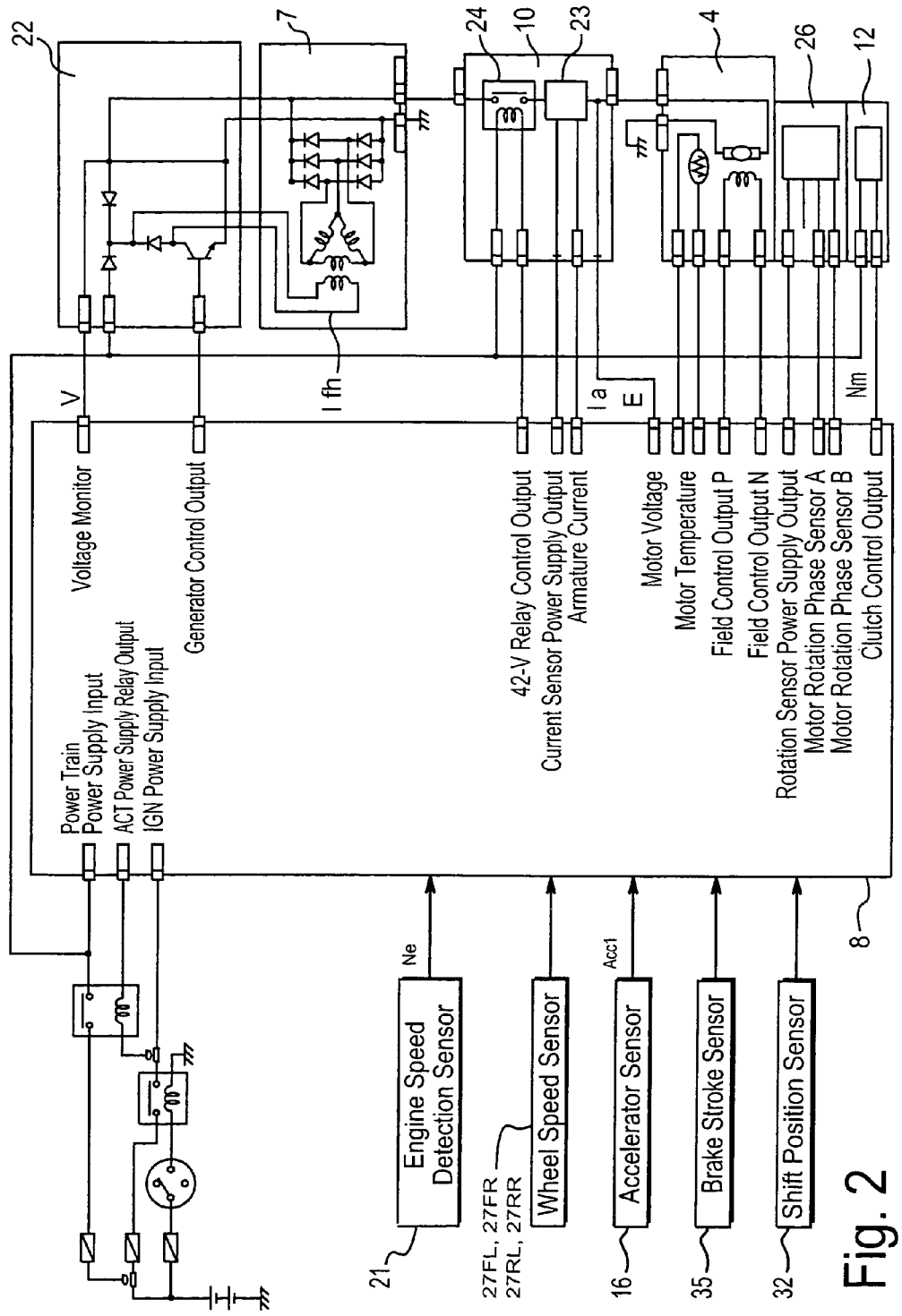
FIG. 2 is a block diagram showing a control system configuration for the vehicle brake control apparatus illustrated in FIG. 1 in accordance with the illustrated embodiment of the present invention.

As shown in FIG. 2, the generator 7 is equipped with a voltage regulator 22 (regulator) for regulating an output voltage V. The 4WD controller 8 controls the generator load torque Th against the internal combustion engine 2 and the generated voltage V by adjusting the field current Ifh such as controlling a generator control command value (duty ratio or field current value). The voltage adjuster 22 receives the generator control command value (duty ratio or field current value) from the 4WD controller 8 and adjusts the field current Ifh of the generator 7 to a value corresponding to the generator control command value. The voltage adjuster 22 is also capable of detecting the output voltage V of the generator 7 and outputting the detected voltage value to the 4WD controller 8.

A current sensor 23 is provided inside the junction box 10. The current sensor 23 detects the current value Ia of the electrical power supplied from the generator 7 to the electric motor 4 and outputs the detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a command from the 4WD controller 8.

A command from the 4WD controller 8 controls the field current Ifm of the electric motor 4 and the adjustment of the field current Ifm adjusts the drive torque Tm.

The vehicle brake control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor.

Incidentally, the motor 4 in the present embodiment operates regeneratively, and imparts the braking torque to the rear wheels 3L and 3R. The regenerative braking torque from the motor 4 is also controlled by adjustment of the field current Ifm.

The clutch 12 is a hydraulic clutch or an electromagnetic clutch that connects and disconnects in response to a clutch control command issued from the 4WD controller 8. Thus, the clutch 12 transmits torque from the electric motor 4 to the rear wheels 3L and 3R at a torque transfer rate corresponding to the clutch control command from the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value that is indicative of the detected rotational speed of the respective wheel 1L, 1R, 3L or 3R. The wheel speed sensors 27RL and 27RR constitute an output shaft rotational speed detector or sensor.

Figure 3:
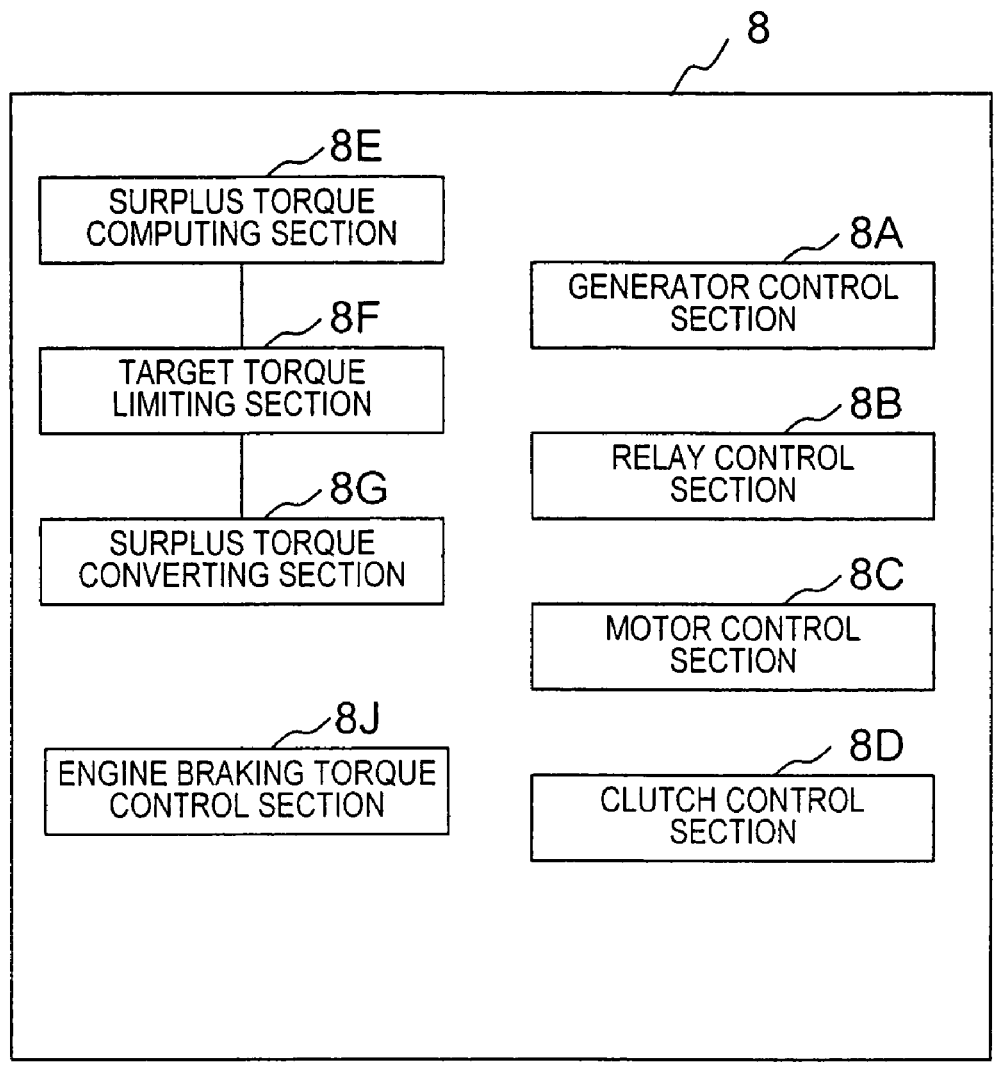
FIG. 3 is a block diagram showing the 4WD controller for the brake control apparatus of the illustrated embodiment of the present invention.

As shown in FIG. 3, the 4WD controller 8 is provided with a generator control section 8A, a relay control section 8B, a motor control section 8C, a clutch control section 8D, a surplus torque computing section 8E, a target torque limiting section 8F, a surplus torque converting section 8G, and an engine brake control section 8J.

Through the voltage adjuster 22, the generator control section 8A monitors the generated voltage V of the generator 7 and adjusts the generated voltage V of the generator 7 to the required voltage by adjusting the field current Ifh of the generator 7. Through the voltage regulator 22, the generator control section 8A also reduces the engine braking torque by driving the generator 7 as a motor, while monitoring the generated voltage V of the generator 7. The generator control section 8A constitutes the motor generator) drive torque controlling section of the present invention.

The relay control section 8B controls shutting off and connecting the power supply from the generator 7 to the electric motor 4. The relay control section 8B also controls electric power supplied from the motor 4 to the generator 7 when the motor 4 is regeneratively operated and the generator 7 is functioning as a motor to drive the engine 2.

The motor control section 8C adjusts the torque of the motor 4 to a required value, e.g., to a target motor regenerative braking torque Tbm* computed by calculation processing discussed later, by adjusting the field current Ifm of the motor 4. In other words, the motor control section 8C adjusts the field current Ifm of the electric motor 4 in order to adjust the torque of the electric motor 4 to the required value. The motor control section 8C constitutes the generator (motor) braking torque controlling section of the present invention.

The clutch control section 8D controls the state of the clutch 12 by outputting a clutch control command to the clutch 12. Specifically, when, for example, a target motor regenerative braking torque Tbm* set by the motor control section 8C is greater than or equal to a prescribed motor torque value $T_{TCL}$ (value corresponding to the dead zone), or when there is a clutch engagement request from separate arithmetic processing, then the input side rotational speed and the output side rotational speed of the clutch are matched, and the clutch is engaged when both are rotationally matched. In addition, the clutch is released if, for example, the target motor regenerative braking torque Tbm* falls below the prescribed motor torque value $T_{TCL}$.

In addition, looped processing is performed in the following sectional sequence: the surplus torque computing section 8E, the target torque limiting section 8F, and the surplus torque converting section 8G. The looped sequence is performed at a predetermined sampling interval, and is based on inputted signals.

First, in the surplus torque computing section 8E, the slip speed (acceleration slippage) is computed by, for example, subtracting the average rear wheel speed of the rear wheels 3L and 3R from the average front wheel speed of the front wheels 1L and 1R, computing the absorbed torque needed to suppress acceleration slip of the front wheels 1L, 1R, computing the present load torque of the generator 7, and deriving the surplus torque, i.e., the target generation load torque that should be carried by the generator 7.

Next, in the target torque limiting section 8F, it is determined whether the target generation load torque is greater than the maximum load capacity of the generator 7. If, for example, it is determined that the target generation load torque is greater than the maximum load capacity of the generator 7, then the excess torque that exceeds the maximum load capacity is derived, the engine torque upper limit is computed by subtracting the excess torque from the present engine torque, that value is output to the engine controller 18, and the target generation load torque is set to the maximum load capacity.

Next, in the surplus torque converting section 8G, the target motor field current is computed in accordance with the speed of the motor 4 detected by the motor speed sensor 26, the target motor field current is output to the motor control section 8C, the induced voltage of the motor 4 is computed from the target motor field current and the speed of the motor 4, the target motor torque is computed based on the generation load torque computed by the surplus torque computing section 8E, the corresponding target armature current is computed using the target motor torque and the target motor field current as variables, the target voltage of the generator 7 is computed from the target armature current, the resistance, and the induced voltage, and the target voltage of the generator 7 is output to the generator control section 8A.

The following explains the operation of the apparatus as constituted above.

If the front wheels 1L an 1R, which are the main drive wheels, undergo acceleration slip due to a small road surface μ or due to the large depression quantity of the accelerator pedal 17 by the driver, then the drive torque transmitted to the front wheels 1L and 1R is adjusted by the generator 7 generating electric power with a generation load torque corresponding to that acceleration slippage. As a result, acceleration slip of the front wheels 1L and 1R, which are the main drive wheels, is suppressed.

The above describes the action of the four-wheel drive state using the motor 4 as a drive source, principally when the vehicle starts from a stop. In contrast, the motor 4 of the four-wheel drive vehicle of the present embodiment is also used to obtain a braking torque by regeneratively operating the motor 4 when the engine braking torque operates as previously discussed. It is the engine braking torque controlling section 8J that functions when the engine braking torque operates. Furthermore, the drive torque is treated as a positive value, and the braking torque is treated as a negative value. However, in the present embodiment, they are treated as torques simply having different directions, and both are treated as positive values (taking the absolute values, or evaluating their magnitudes).

Figure 5:
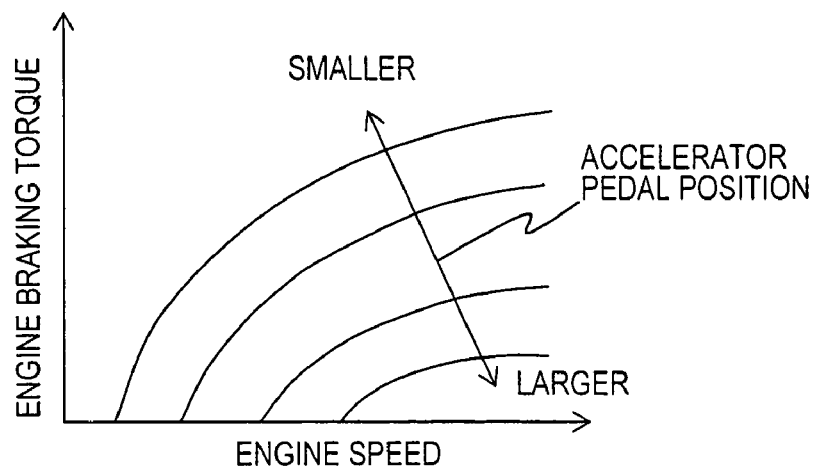
FIG. 5 is a control map used in the arithmetic processing sequence executed by the 4WD controller in FIG. 4.

In accordance with the arithmetic processing shown in FIG. 5, the engine braking torque controlling section 8J, the target throttle opening $Acc_2^*$, the target generator field current Ifh, and the target motor field current Ifm are computed for when the engine braking torque operates. This arithmetic processing is executed by a timer interrupt processing at a prescribed sampling interval $\Delta T$, set on the order of, for example, 10 ms. Furthermore, this arithmetic processing is not particularly provided with a step for communication, but the information obtained by the arithmetic processing is updated in memory as needed, and information needed for arithmetic processing is read in from memory as needed, or from another controller.

In this arithmetic processing, the 4WD controller 8 of the brake control apparatus of the present invention is constituted so that it sets the braking torques of the front and rear wheels 1L, 1R, 3L and 3R by distributing the engine braking torque so that it is made an ideal braking torque distribution, and performs control so that that braking torque matches the electrical braking torque from the generator/motor 4. Consequently, the braking torques of the front and rear wheels 1L, 1R, 3L and 3R approach the ideal braking torque distribution, even if only the engine braking torque acts upon only one of either the rear or front wheels. Thus, the brake control apparatus of the present invention is constituted so that it prevents the tendency for only one of either the front or rear wheels to lock before the other wheels.

In step S0, the 4WD controller 8 first determines whether the vehicle state is presently in a four-wheel drive state. If the vehicle is in a four-wheel drive state, then processing proceeds to step S1, otherwise processing returns to the main program.

In step S1, the accelerator pedal position $Acc_1$ detected by the accelerator pedal sensor 16 is read in by the 4WD controller 8.

Next, processing proceeds to step S2, where the engine speed Ne detected by the engine speed sensor 21 is read in by the 4WD controller 8.

Next, processing proceeds to step S3, where the engine braking torque Tbe corresponding to the engine speed Ne and the accelerator pedal position $Acc_1$ is computed by the 4WD controller 8 from, for example, the control map shown in FIG. 5.

Next, processing proceeds to step S4, where the 4WD controller 8 determines whether the friction state between the wheels and the road surface is in a low-friction state by using, for example, the operation of the windshield wipers, or the detection of acceleration slip of the front wheels 1L and 1R, which are the main drive wheels, by the immediately preceding arithmetic processing. If the friction state between the wheels and the road surface is a low-friction state, then processing proceeds to step S5. Otherwise, processing proceeds to step S20. Furthermore, any other method would also be acceptable for the technique for detecting whether the friction state between the wheels and the road surface is a low friction state.

In step S5, because, for example, the present state is a two-wheel drive state, the vehicle body deceleration G is computed from the time derivative of the average rear wheel speed detected by the wheel speed sensors 27RL and 27RR of the rear wheels 3L and 3R, which are the subordinate drive wheels. Processing subsequently proceeds to step S6.

Figure 6:
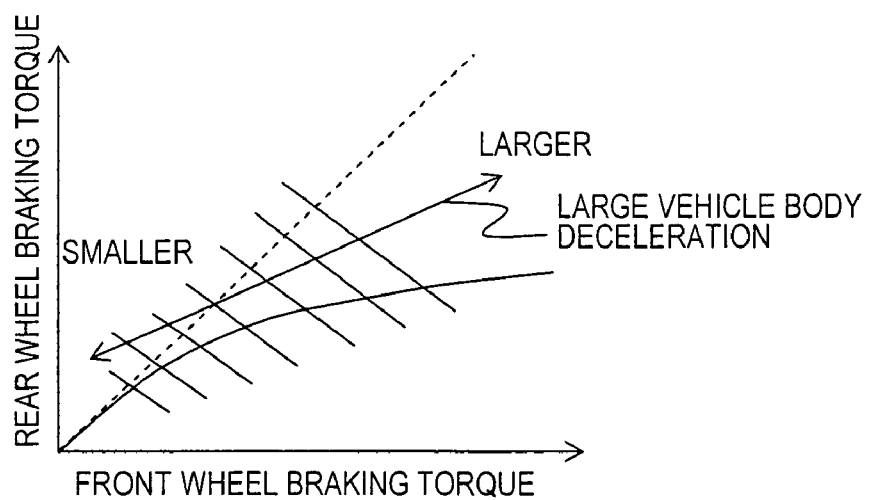
FIG. 6 is a control map used in the arithmetic processing sequence executed by the 4WD controller in FIG. 4.

In step S6, the ideal braking force distribution (easier to understand if thought of as a ratio) of the front and rear wheels 1L and 1R is derived in accordance with the vehicle body deceleration G computed in the previous step S5, in accordance with, for example, the ideal braking torque distribution map shown in FIG. 6. To reach this ideal braking force distribution, the engine braking torque Tbe computed in step S3 is distributed between the front and rear wheels. The target front wheel braking torque Tbf* and the target rear wheel braking torque (in this case, the target motor regenerative braking torque Tbm*) for the corresponding to the ideal braking torque distribution are thereby calculated, for example, using the ideal braking torque distribution map shown in FIG. 6. Processing by the 4WD controller 8 then proceeds to step S7.

In step S7, the standard throttle opening $Acc_{20}^*$ needed to achieve the target front wheel braking torque Tbf* is computed by the 4WD controller 8, and processing then proceeds to step S8.

In step S8, the 4WD controller 8 determines whether the standard throttle opening $Acc_{20}^*$ computed in step S7 is greater than or equal to the maximum throttle opening $Acc_{MAX}$ of the throttle valve 15. Namely, the 4WD controller 8 determines whether the target front wheel braking torque Tbf* can be achieved by controlling the throttle opening. If the standard throttle opening $Acc_{20}^*$ is greater than or equal to the maximum throttle opening $Acc_{MAX}$, then processing proceeds to step S9. Otherwise, processing proceeds to step S13.

In step S9, the maximum throttle opening $Acc_{MAX}$ is set to the target throttle opening $Acc_2^*$, and processing then proceeds to step S10.

In step S10, the value calculated by subtracting the maximum engine braking torque $T_{ACCMAX}$, corresponding to the maximum throttle opening $Acc_{MAX}$, from the target front wheel braking torque Tbf*, is assigned as the target generator drive torque Th*. Processing then proceeds to step S11.

However, in step S13, the standard throttle opening $Acc_{20}^*$ computed in step S7 is set to the target throttle opening $Acc_2^*$, and processing then proceeds to step S15.

In step S15, the target generator drive torque Th* is set to zero, and processing then proceeds to step S11.

In step S11, the target generator field current Ifh to achieve the target generator drive torque Th* is computed by the 4WD controller 8. Processing then proceeds to step S16.

In step S16, the target motor field current Ifm to achieve the target motor regenerative braking torque Tbm* is computed by the 4WD controller 8, and processing then proceeds to step S17.

In step S17, the target throttle opening $Acc_2^*$ set in step S9 or step S13 is output to the motor controller 20, the target generator field current Ifh computed in step S11 is output to the generator control section 8A, the target motor field current Ifm computed in step S16 is output to the motor control section 8C, and processing then returns to the main program.

In contrast, if the vehicle is in not in a low friction state, the processing proceeds to step S20, where the 4W D controller 8 determines whether the engine braking torque Tbe computed in step S3 is less than the present generatable maximum motor regenerative braking torque $Tbm_{MAX}$. If the engine braking torque Tbe is less than the maximum motor regenerative braking torque $Tbm_{MAX}$, then processing proceeds to step S21. Otherwise processing proceeds to step S24.

In step S21, the engine braking torque Tbe is set as the target motor regenerative braking torque Tbm*, and processing then proceeds to step S22.

In step S22, the target engine braking torque Tbe* is set to zero, and processing then proceeds to step S23.

However, in step S24, the maximum motor regenerative braking torque $Tbm_{MAX}$ is set as the target motor regenerative braking torque Tbm*, and processing then proceeds to step S25.

In step S25, the target engine braking torque Tbe* is set to a value computed by subtracting the maximum motor regenerative braking torque $Tbm_{MAX}$ from the engine braking torque Tbe, and processing then proceeds to step S23.

In step S23, the target throttle opening $Acc_2$* that achieves the target engine braking torque Tbe* is computed, and processing proceeds to step S26.

In step S26, the target motor field current Ifm that achieves the target motor regenerative braking torque Tbm* set in step S21 or step S24 is computed, and processing then proceeds to step S27.

In step S27, the target throttle opening $Acc_2$* set in step S22 or step S25 is output to the motor controller 20, the target motor field current Ifm computed in step S26 is output to the motor control section 8C, and processing then returns to the main program.

According to this arithmetic processing, if the engine braking torque acts upon the front wheels 1L and 1R as when the driver releases the accelerator pedal 17, then the engine braking torque Tbe is derived from the engine speed Ne and the accelerator pedal position $Acc_1$. If the friction state between the wheels and the road surface is determined to be a low-friction state, then motor regenerative braking is performed so that the braking torque distribution between the front and rear wheels is made to approach the ideal braking torque distribution that avoids locking of the wheels. In particular, the target motor regenerative braking torque Tbm* is computed as a function of the target front wheel braking torque Tbf* and the target rear wheel braking torque so that the sum of the front wheel engine braking torque and the rear wheel regenerative braking torque matches the original engine braking torque Tbe.

Further, if the standard throttle opening $Acc_{20}$* that achieves the target front wheel braking torque Tbf* is less than the maximum throttle opening $Acc_{MAX}$, then the standard throttle opening $Acc_{20}$* is set to the target throttle opening $Acc_2$*, the target generator drive torque Th* is set to zero, and the target motor field current Ifm and the target throttle opening $Acc_2$* that achieve the target motor regenerative braking torque Tbm* are output. As a result, the braking torque of the front wheels 1L and 1R from the engine braking torque of the engine 2 is reduced by up to the target front wheel braking torque Tbf*, when the motor 4 is regeneratively operated. Thus, the target motor regenerative braking torque Tbm* acts upon the rear wheels 3L and 3R so that the braking torque distribution of the front and rear wheels is made to approach the ideal braking torque distribution. Consequently, the tendency for one of either the front or rear wheels to lock can be prevented even on road surfaces in a low-friction state. In addition, particularly because the sum value of the target front wheel braking torque Tbf* and the target rear wheel braking torque, i.e., the target motor regenerative braking torque Tbm*, matches the engine braking torque Tbe in the accelerator pedal release state, there is no discomfort because it matches the deceleration in the accelerator pedal release state.

In addition, if the standard throttle opening $Acc_{20}$* that achieves the target front wheel braking torque Tbf* is greater than or equal to the maximum throttle opening $Acc_{MAX}$, then the maximum throttle opening $Acc_{MAX}$ is set to the target throttle opening $Acc_2$*, but the target generator drive torque Th* is set to the value obtained by subtracting the maximum engine braking torque $T_{AccMAX}$ corresponding to the maximum throttle opening $Acc_{MAX}$ from the target front wheel braking torque Tbf*, and the target generator field current Ifh that achieves the target generator drive torque Th* is output to the generator control section 8A. In other words, if the target front wheel braking torque Tbf* cannot be achieved by simply adjusting the throttle opening of the throttle valve 15, then that torque shortfall, i.e., the drive torque in this case, is added to the engine 2 by the generator 7. In other words, the braking torque that acts upon the front wheels 1L and 1R from the engine 2 is thereby decreased due to the addition of the drive torque from the generator 7. Thus, the braking torque distribution of the front and rear wheels more definitively approaches the ideal braking torque distribution, and vehicle safety can thereby be much more reliably maintained. In particular, in the case of a batteryless four-wheel drive vehicle such as in the present embodiment, the electrical power obtained by regeneratively operating the motor 4 can directly drive the generator 7, thus not wasting the electrical power.

Controlling the engine braking torque in this manner is a control mode that is possible only in a vehicle in which one of either the front or rear wheels is driven by the engine and the other wheels can be regeneratively braked by a motor. Even in a typical hybrid vehicle, control is performed by, for example, opening the throttle valve and reducing the engine braking torque, but reducing the engine braking torque increases the motor regenerative braking torque, with the object to increase the amount that the battery is charged, and is not for the purpose of balancing the braking torque of the front and rear wheels so as to approach the ideal braking torque. In addition, the retarder installed on vehicles equipped with large displacement diesel engines is provided on main drive wheels, i.e., the wheels which the engine braking torque acts upon, and therefore does not distribute the overall braking torque corresponding to the engine braking torque to the front and rear wheels.

However, when the friction state between the wheels and the road surface is not in a low friction state, the engine braking torque Tbe is compared with the maximum regenerative braking torque $Tbm_{MAX}$. If the engine braking torque Tbe is less than the maximum regenerative braking torque $Tbm_{MAX}$, then the value of engine braking torque Tbe is set to the target motor regenerative braking torque Tbm* with=out any adjustments, and the target engine braking torque Tbe* is set to zero. Iif the engine braking torque Tbe is not less than the maximum regenerative braking torque $Tbm_{MAX}$, then the maximum regenerative braking torque $Tbm_{MAX}$ is set to the target motor regenerative braking torque Tbm*, and the target engine braking torque Tbe* is set to the value computed by subtracting the maximum regenerative braking torque $Tbm_{MAX}$ from the engine braking torque Tbe. In other words, the portion of the engine braking torque that is supplemented by the regenerative braking torque is completely transferred to regenerative braking, and the regenerative braking acts in place of a part or all of the engine braking torque. Consequently, this control improves the kinetic energy recovery efficiency. Furthermore, this control does not tend to lock one of either the front or rear wheels because it is performed when the friction state between the wheels and the road surface is not a low friction state, as described earlier.

Figure 4:
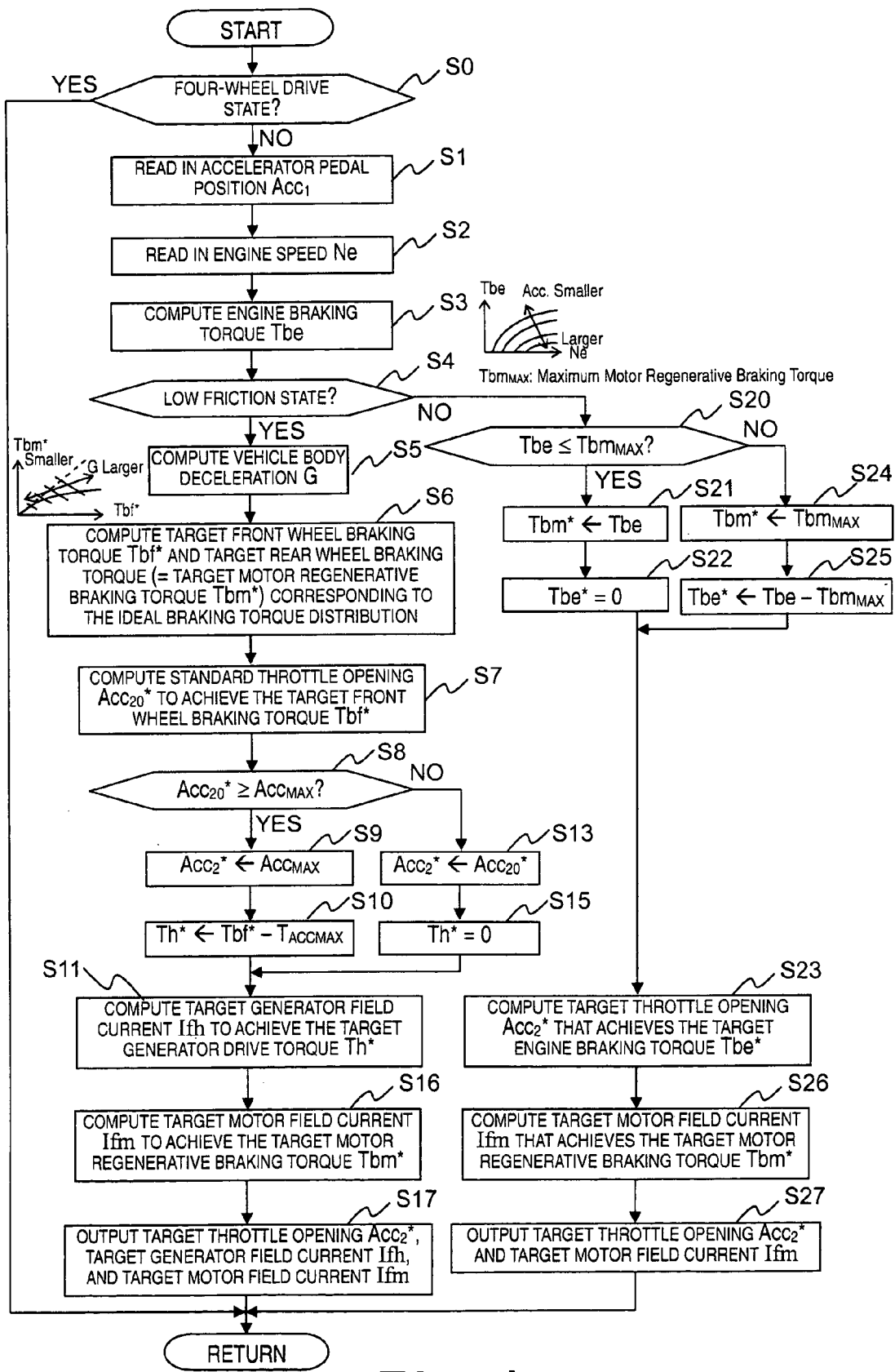
FIG. 4 is a flow chart showing the arithmetic processing sequence executed by the 4WD controller for the brake control apparatus illustrated in FIG. 1 of the illustrated embodiment of the present invention.

Based on the above, the arithmetic processing in steps S1 through S3 shown in FIG. 4 constitutes the engine braking torque computing section of the present invention. Likewise below, the arithmetic processing of step S6 in FIG. 4 constitutes the braking torque distributing section. The engine controller 18 in FIG. 1 and the arithmetic processing in steps S7 through S9, S13 and S17 in FIG. 4 constitute the engine braking torque controlling section. The motor controller section 8C in FIG. 3 and the arithmetic processing in steps S16, S17, S21, S24, S26, and S27 in FIG. 4 constitute the generator (motor) braking torque controlling section. The generator control section 8A in FIG. 3 and the arithmetic processing in steps S11 and S17 in FIG. 4 constitute the motor (generator) drive torque controlling section. The arithmetic processing in step S4 in FIG. 4 constitutes the low road surface friction state detecting section.

Furthermore, the electrical braking of the present invention adds to the regenerative braking, as discussed earlier, and includes the case in which the electrical generation load from the generator 7 front-rear wheel braking distribution is used in braking.

In addition, the abovementioned embodiment illustrates the case of a four wheel drive vehicle, but is also applicable to a two-wheel drive vehicle that uses the motor 4 as a drive source.

In addition, it is also acceptable for the generator 7 to be coupled to the engine 2 by a belt or chain and the like. However, it is necessary in that case to take into consideration stretching and slipping of the belt or chain.

In addition, the abovementioned embodiment is arranged so that the actual front-rear wheel braking distribution approximately matches the ideal front-rear wheel braking distribution. However, as long as it approaches the ideal front-rear wheel braking distribution, it is acceptable even if the actual front-rear wheel braking distribution does not necessarily match the ideal front-rear wheel braking distribution.

In addition, in accordance with one aspect of the present invention, the regenerative braking torque can also simply be added so that the ideal braking torque distribution corresponding to the regularly generated engine braking is obtained.

In addition, it is acceptable even if a reduction gear or clutch is not disposed between the subordinate drive source and the wheels. If there is no clutch, then a current must be impressed on the motor, which is the subordinate drive source.

In addition to the engine driving the front wheels, a mode is also acceptable wherein the engine drives the rear wheels.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-039168 and 2003-399507. The entire disclosures of Japanese Patent Application Nos. 2003-039168 and 2003-3995074 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A brake control apparatus comprising:
    an engine braking torque computing section configured and arranged to compute an engine braking torque of an engine that drives a first wheel; and
    a generator braking torque controlling section configured and arranged to control an electrical braking torque of a generator that is configured and arranged to electrically brake a second wheel so that a first to second target wheel braking torque distribution approaches an ideal braking torque distribution between the first and second wheels based on the engine braking torque computed by the engine braking torque computing section, when the engine applies the engine braking torque to the first wheel.

2. The brake control apparatus as recited in claim 1, further comprising
    a braking torque distributing section configured and arranged to distribute the engine braking torque computed by the engine braking torque computing section between a first wheel target braking torque for the first wheel and a second wheel target braking torque for the second wheel.

3. The brake control apparatus as recited claim 2, further comprising
    an engine braking torque controlling section configured and arranged to control the engine braking torque so that a braking torque of the first wheel driven by the engine approximately matches the first wheel target braking torque, and
    the generator braking torque controlling section being further configured and arranged to control the electrical braking torque so that a braking torque of the second wheel by the generator approximately matches the second wheel target braking torque.

4. The brake control apparatus as recited claim 3, further comprising
    a motor drive torque controlling section configured and arranged to drive a motor that supplements driving of the engine to reduce the engine braking torque of the engine.

5. The brake control apparatus as recited claim 4, wherein the motor drive torque controlling section is further configured and arranged to supply electrical power to the motor obtained by electrically braking the generator.

6. The brake control apparatus as recited in claim 5, further comprising a throttle opening determining section configured and arranged to determine an accelerator position opening degree, and the engine braking torque computing section being further configured and arranged to control the braking torque of the first wheel driven by the engine to approximately match the first wheel target braking torque by selectively driving of the motor to supplement driving of the engine based on the accelerator position opening degree detected by the throttle opening determining section.

7. The brake control apparatus as recited in claim 1, further comprising an engine speed detecting section configured and arranged to detect an engine speed of the engine; and a throttle opening determining section configured and arranged to determine an accelerator position opening degree, the engine braking torque computing section being further configured and arranged to compute the engine braking torque based on the engine speed detected by the engine speed detecting section and based on the accelerator position opening degree detected by the throttle opening determining section.

8. The brake control apparatus as recited in claim 1, further comprising a low road surface friction state detecting section configured and arranged to detect whether a friction state between the first and second wheels and a road surface is a low friction state; and the generator braking torque controlling section being further configured and arranged to control the electrical braking torque from the generator, when the low road surface friction state detecting section detects that the friction state between the first and second wheels and the road surface is in the low friction state, so that the first to second wheel target braking torque distribution from the engine braking torque and the electrical braking torque is made to approach the ideal braking torque distribution between the first and second wheels.

9. The brake control apparatus as recited in claim 8, wherein the generator braking torque controlling section is further configured and arranged to control the electrical braking torque from the generator to approximately maximize regenerative braking, when the low road surface friction state detecting section detects that the friction state between the wheels and the road surface is not in the low friction state; and further comprising an engine braking torque controlling section configured and arranged to control the engine braking torque so that a braking torque of the engine braking torque from the engine is reduced in relation to the regenerative braking torque by the generator.

10. The brake control apparatus as recited in claim 8, further comprising a braking torque distributing section configured and arranged to distribute the engine braking torque computed by the engine braking torque computing section between a first wheel target braking torque for the first wheel and a second wheel target braking torque for the second wheel.

11. The brake control apparatus as recited claim 10, further comprising an engine braking torque controlling section configured and arranged to control the engine braking torque so that a braking torque of the first wheel driven by the engine approximately matches the first wheel target braking torque, and the generator braking torque controlling section being further configured and arranged to control the electrical braking torque so that a braking torque of the second wheel by the generator approximately matches the second wheel target braking torque.

12. The brake control apparatus as recited claim 11, further comprising a motor drive torque controlling section configured and arranged to drive a motor that supplements driving of the engine to reduce the engine braking torque of the engine when the low road surface friction state detecting section detects that the friction state between the wheels and the road surface is in the low friction state.

13. The brake control apparatus as recited claim 12, wherein the motor drive torque controlling section is further configured and arranged to supply electrical power to the motor obtained by electrically braking the generator.

14. The brake control apparatus as recited in claim 13, further comprising a throttle opening determining section configured and arranged to determine an accelerator position opening degree, and the engine braking torque computing section being further configured and arranged to control the braking torque of the first wheel driven by the engine to approximately match the first wheel target braking torque by selectively driving of the motor to supplement driving of the engine based on the accelerator position opening degree detected by the throttle opening determining section.

15. A brake control apparatus comprising:

an engine configured and arranged to drive a first wheel and apply a first wheel engine braking torque to the first wheel;

a generator configured and arranged to apply an electrical braking torque to a second wheel; and a generator braking torque controlling section configured and arranged to control the electrical braking torque of the generator so that a first to second wheel braking torque distribution approaches an ideal braking torque distribution between the first and second wheels, when the engine applies the engine braking torque to the first wheel.

16. The brake control apparatus as recited in claim 15, further comprising an engine braking torque computing section configured and arranged to compute an engine braking torque of the engine that drives the first wheel; and a braking torque distributing section configured and arranged to distribute the engine braking torque computed by the engine braking torque computing section between a first wheel target braking torque for the first wheel and a second wheel target braking torque for the second wheel.

17. The brake control apparatus as recited claim 16, further comprising an engine braking torque controlling section configured and arranged to control the engine braking torque so that a braking torque of the first wheel driven by the engine approximately matches the first wheel target braking torque, and the generator braking torque controlling section being further configured and arranged to control the electrical braking torque so that a braking torque of the second wheel by the generator approximately matches the second wheel target braking torque.

18. The brake control apparatus as recited claim 17, further comprising
a motor configured and arranged to drive the engine; and
a motor drive torque controlling section configured and arranged to drive the motor that supplements driving of the engine to reduce the engine braking torque of the engine.

19. The brake control apparatus as recited claim 18, wherein
the motor drive torque controlling section is further configured and arranged to supply electrical power to the motor obtained by electrically braking the generator.

20. The brake control apparatus as recited in claim 19, further comprising
a throttle opening determining section configured and arranged to determine an accelerator position opening degree, and
the engine braking torque computing section being further configured and arranged to control the braking torque of the first wheel driven by the engine to approximately match the first wheel target braking torque by selectively driving of the motor to supplement driving of the engine based on the accelerator position opening degree detected by the throttle opening determining section.

21. The brake control apparatus as recited in claim 15, further comprising
an engine speed detecting section configured and arranged to detect an engine speed of the engine; and
a throttle opening determining section configured and arranged to determine an accelerator position opening degree,
the engine braking torque computing section being further configured and arranged to compute the engine braking torque based on the engine speed detected by the engine speed detecting section and based on the accelerator position opening degree detected by the throttle opening determining section.

22. The brake control apparatus as recited in claim 15, further comprising
a low road surface friction state detecting section configured and arranged to detect whether a friction state between the first and second wheels and a road surface is a low friction state; and
the generator braking torque controlling section being further configured and arranged to control the electrical braking torque from the generator, when the low road surface friction state detecting section detects that the friction state between the first and second wheels and the road surface is in the low friction state, so that the first to second wheel target braking torque distribution from the engine braking torque and the electrical braking torque is made to approach the ideal braking torque distribution between the first and second wheels.

23. The brake control apparatus as recited in claim 22, wherein
the generator braking torque controlling section is further configured and arranged to control the electrical braking torque from the generator to approximately maximize regenerative braking, when the low road surface friction state detecting section detects that the friction state between the wheels and the road surface is not in the low friction state; and further comprising
an engine braking torque controlling section configured and arranged to control the engine braking torque so that a braking torque of the engine braking torque from the engine is reduced in relation to the regenerative braking torque by the generator.

24. The brake control apparatus as recited in claim 22, further comprising
a braking torque distributing section configured and arranged to distribute the engine braking torque computed by the engine braking torque computing section between a first wheel target braking torque for the first wheel and a second wheel target braking torque for the second wheel.

25. The brake control apparatus as recited claim 24, further comprising
an engine braking torque controlling section configured and arranged to control the engine braking torque so that a braking torque of the first wheel driven by the engine approximately matches the first wheel target braking torque, and
the generator braking torque controlling section being further configured and arranged to control the electrical braking torque so that a braking torque of the second wheel by the generator approximately matches the second wheel target braking torque.

26. The brake control apparatus as recited claim 25, further comprising
a motor configured and arranged to drive the engine; and
a motor drive torque controlling section configured and arranged to drive the motor that supplements driving of the engine to reduce the engine braking torque of the engine when the low road surface friction state detecting section detects that the friction state between the wheels and the road surface is in the low friction state.

27. The brake control apparatus as recited claim 26, wherein
the motor drive torque controlling section is further configured and arranged to supply electrical power to the motor obtained by electrically braking the generator.

28. The brake control apparatus as recited in claim 27, further comprising
a throttle opening determining section configured and arranged to determine an accelerator position opening degree, and
the engine braking torque computing section being further configured and arranged to control the braking torque of the first wheel driven by the engine to approximately match the first wheel target braking torque by selectively driving of the motor to supplement driving of the engine based on the accelerator position opening degree detected by the throttle opening determining section.

29. A brake control apparatus comprising:
engine braking torque computing means for computing an engine braking torque of an engine that drives a first wheel; and
generator braking torque controlling means for controlling an electrical braking torque of a generator that is configured and arranged to electrically brake a second wheel so that a first to second wheel braking torque distribution approaches an ideal braking torque distribution between the first and second wheels based on the engine braking torque computed by the engine braking torque computing means, when the engine applies the engine braking torque to the first wheel.

30. A method of controlling vehicle braking comprising:
    computing an engine braking torque of an engine that drives a first wheel; and
    controlling an electrical braking torque of a generator that is configured and arranged to electrically brake a second wheel so that a first to second wheel braking torque distribution approaches an ideal braking torque distribution between the first and second wheels based on the engine braking torque computed by the engine braking torque computing section, when the engine applies the engine braking torque to the first wheel.

* * * * *